INVENTOR:
NORMAN E. ELSAS

BY

ATTORNEY 3,094,889
Patented June 25, 1963

1

3,094,889
DIE CUTTING MACHINE
Norman E. Elsas, Atlanta, Ga., assignor to Nemo Industries, Inc., Atlanta, Ga., a corporation of Georgia
Filed Feb. 9, 1959, Ser. No. 792,174
3 Claims. (Cl. 83—529)

This invention relates to a die cutting machine, and more particularly concerns a die cutting machine for the rapid cutting of heavy as well as light fabrics. The present invention is an improvement over the die cutting arrangement disclosed in my copending application, Serial No. 758,234, filed September 2, 1958.

Many operations in the textile industry require the modification of corners or edges or otherwise require repeated cuts of various configurations in large sheets of material. Heretofore, such cutting has been accomplished manually or by low-speed machinery, resulting in a relatively slow and, consequently, costly operation. In addition to being time consuming, manual methods have had the attendant disadvantage of high waste resulting from errors and inaccuracies in the measuring and cutting. Where machinery was utilized for this purpose, many problems arose with respect to providing apparatus of satisfactory reliability and life to perform such operations, particularly where the material was heavy, tough or closely woven.

One of the objects of this invention, therefore, is to overcome these and many other problems encountered with conventional arrangements by the provision of a new and improved die cutting machine which is capable of functioning effectively at a high repetition rate over a long period of time.

Another object of this invention is to provide a new and improved method of operating a die cutting machine for heavy as well as light fabrics, not only permitting operation without maintenance for relatively long periods of time, but also providing for an unusually long overall life.

A further object of this invention is to provide a new and improved die cutting machine in which the length of the stroke may be accurately adjusted to minimize depression of the die in the anvil so as to increase the life of both the anvil and die.

Still another object of this invention is to provide a new and improved die cutting machine for heavy as well as light fabrics, which provides for rotation of the soft aluminum anvil thereof, whereby life of the anvil may be greatly extended between resurfacing operations.

Still another object of this invention is to provide a new and improved die cutting machine which is simple in construction and operation and well adapted to meet the demands of economic manufacture.

A further object of this invention is to provide a new and improved die cutting machine for fabrics which utilizes kinetic energy, i.e. high velocity of the die to obtain the necessary force for cutting, rather than employing a die head of large mass as with many conventional arrangements.

Numerous other objects, features and advantages of the present invention will become apparent from consideration of the following specification taken in conjunction with the accompanying drawings wherein like designators refer to the same or similar parts throughout the several views, and in which.

Figure 1:
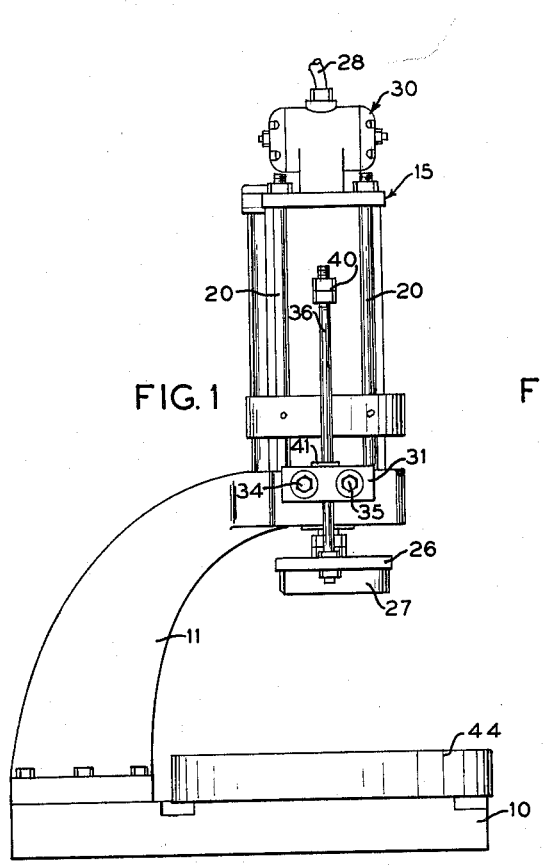
FIG. 1 is a side elevation of one form of die cutting machine according to my invention.
Figure 2:
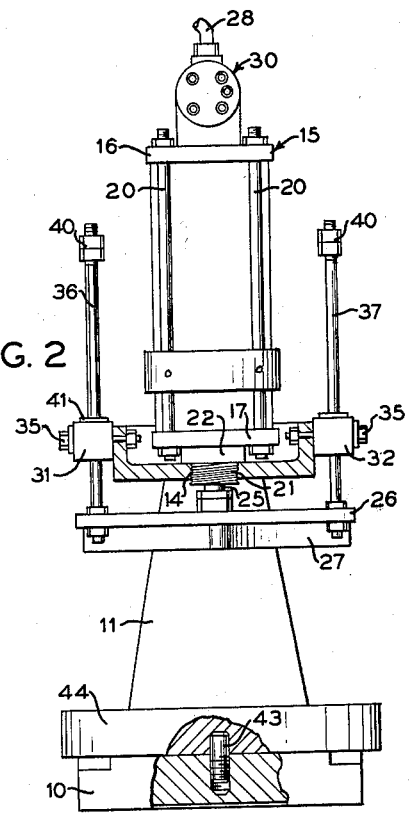
FIG. 2 is a front elevation, partly broken away, showing the pin centering arrangement for the rotatable anvil of the die cutting machine of FIG. 1.

Referring now more particularly to the drawings, that form of the invention here shown by way of illustration includes a base 10 having bolted to the rearward end thereof a standard or support 11 that extends upwardly curving over the base 10. The upper end of standard 11 is formed with a rectangular cradle 12, the floor 13 of which has a threaded aperture 14 centrally therein for securing the lower end of a conventional pneumatic cylinder 15. Cylinder 15 may be of the type disclosed in U.S. Patent No. 2,720,864, and can be generally characterized as having upper and lower end plates 16 and 17 securing a sleeve 18 therebetween by the spaced elongate bolts 20. The lower end plate 17 has fixed thereto a bushing 21 which is threadably received in the cradle floor aperture 14, such engagement being limited by the rectangular shoulder 22 on bushing 21 adjacent end plate 17. Piston rod or plunger 25 of the pneumatic cylinder 15 passes through bushing 21 to have bolted at its lower end a die head 26, the latter having a generally V-shaped cutting die 27 welded or otherwise suitably secured to the underside thereof. Pneumatic cylinder 15 is energized from pneumatic line 28 through the conventional electrical solenoid valve 30, such as that disclosed in U.S. Patent No. 2,641,229, which selectively directs pressure into the upper and lower ends of cylinder 15 so as to effect both downward and upward movement of piston rod 25, along with die head 26 and die 27.

To check downward movement of die head 26, arrester blocks 31 and 32 are each secured to opposite sides of cradle 12 by the transverse bolts 34 and 35. Limit rods 36 and 37 are each bolted to die head 28, coplanar with piston rod 25, and extend upwardly from the die head passing freely through apertures in blocks 31 and 32, respectively. To adjustably determine the stroke length of piston rod 25, each limit rod has a positionable stop nut assembly 40 at its upper end, the arrangement being such that upon predeterminable downward movement of the die head, the stop nut assemblies 40 abut the upper side of arrester blocks 31 and 32. To increase the effective area of impact of the stop nut assemblies 40 against the arrester blocks, the washers 41 may be provided about limit rods 36 and 37, respectively, on the upper side of the arrester blocks. It will be noted that the arrangement is such that the cutting force utilized during each stroke of the die is developed from the high velocity of the die, rather than its mass, thereby permitting a relatively high repetition rate since the die inertia is low.

Rotatably supported on base 10 by a pin 43 is a soft metal anvil 44, preferably made of cast aluminum. The lower side of the anvil rests in frictional contact with the upper side of base 10, with the pin 43 being threaded therein so as to center the anvil for free rotation thereon. The base 10 should extend under the full area of the anvil to prevent distortion of the anvil from impact of the die. It is also to be noted that the die 27 would normally be secured to the die head 26 so that the center of the die configuration would lie under the center line of the plunger 25 to effect proper balancing of forces. In the use of irregular dies, the center of the die configuration would also normally be offset from the center of rotation of the anvil 44 so as to make maximum use of the surface area of the anvil 44. In instances where the cutting edge of the die does not pass through the center of rotation of the anvil 44, the pin centering hole may pass through the anvil 44 so as to permit the anvil 44 to be readily turned over for use on both sides before the refinishing operation.

Impact of die 27 against anvil 44 has been found to effect a random rotation of the anvil 44, due partly to vibration and due partly to the normal inaccuracy of the die 27. Upon each stroke of the plunger 25 the die 27 cuts through the fabric passing over the anvil 44 and cuts slightly into the upper face of the anvil 44. It will be recognized that after a great many operations the upper surface of the anvil 44 becomes badly scarred, necessitating a refinishing operation. It can be seen that this random rotation of the anvil 44 greatly increases the effective life of the anvil surface between refinishing operations. After each refinishing operation, the stroke of the die head 26 may be readily adjusted to again obtain the proper cut. Since the depression of the cutting die 27 in the anvil surface can be adjusted to a minimum, it will be apparent that the invention also greatly retards dulling of the die 27. In addition, this arrangement also reduces the strain on the piston rod 25 and piston, since the latter will not "bottom" in the cylinder 15, thereby increasing the effective life of this assembly.

Figure 3:
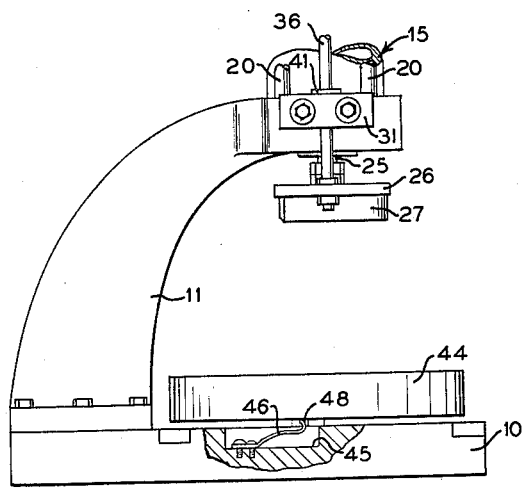
FIG. 3 is a fragmentary view of a modification of the machine of FIG. 1, partly broken away, showing the spring arrangement for effecting random rotation of the anvil.
Figure 4:
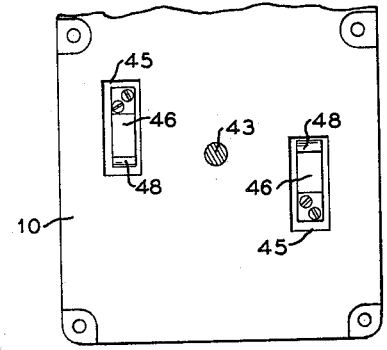
FIG. 4 is a top plan view of the modification of FIG. 3, partly in section, with the anvil removed to more clearly show the spring arrangement for effecting rotation of the anvil.

FIGS. 3 and 4 show a modification of the present invention which insures a positive rotation of the anvil 44. In this arrangement, the base 10 is recessed on either side of pin 43, as at 45, with each recess 45 having secured therein one of the generally flat springs 46, the arrangement being such that the return-bent or hook portions 48 at the free end of each spring 46 normally urge the anvil 44 upwardly so as to lift it slightly above the base 10. Impact of the die 27 on the anvil 44 depresses the latter causing the hook portion 48 of each spring 46 to compress into its respective recess 45. Subsequent upward return of the die 27 permits the springs 46 to again lift the anvil 44 slightly off the base. During this motion the hook portion 48 of each spring 46 engages the underside of the anvil 44 so as to rotate the anvil 44 slightly in a clockwise direction, as viewed in FIG. 4. It will be noted that the engaging hook portions 48 of each spring 46 are disposed generally radial with respect to pin 43 so as to maximize the rotating effect, thereby providing in a positive manner for random rotation of the anvil 44 so as to greatly extend its useful life between refinishing operations.

In the practice of the invention, it will be recognized that arrangements, other than standard 11, may be provided for supporting the base 10 and cylinder 15 in spaced relation. For example, the cylinder 15 may be mounted on an upper beam and the base 10 on a lower beam of a machine utilized for other operations on the fabric, and embodiments of the invention with spacing as great as eight to ten feet between the cylinder and base are contemplated. In addition, depending on the fabric to be cut it may be desirable to control the impact force of the die 27, and for this purpose a suitable air cylinder pressure regulator may be provided either in the solenoid 30, in the pressure line or at the pressure source.

From the foregoing it will be apparent that I have provided a new and improved die cutting machine, which machine is well adapted to fulfill the aforestated objects of the invention. Moreover, whereas the invention has been disclosed with respect to certain embodiments thereof, it will be understood to those skilled in the art to which the invention most nearly appertains that other embodiments and variations thereof may be provided or resorted to within the spirit or scope of the invention as defined by the appended claims.

I claim:

1. In a die cutting machine having a base, a pneumatic cylinder, means supporting said base and pneumatic cylinder in spaced relation, a plunger operated by said cylinder, a die head secured to said plunger, means connected between said supporting means and die head for adjustably determining the maximum stroke of said plunger, a movable anvil rotatably supported on said base in a plane normal to the line of movement of said plunger and movable by said plunger, and spring means responsive to the movement of said anvil upon each stroke of said plunger for effecting rotation of said anvil, said spring means including a spring secured to said base within a recess therein, said spring having a return-bent free end urging said anvil upwardly.

2. In a die cutting machine having a base, a pneumatic cylinder, means supporting said base and pneumatic cylinder in spaced relation to each other, a plunger operated by said cylinder, a die head secured to said plunger, means connected between said supporting means and said die head for adjustably determining the maximum stroke of said plunger, an anvil rotatably supported on said base in a plane normal to the line of movement of said plunger, said anvil being freely movable along its axis of rotation toward and away from said base, and spring means responsive to the impact of said die head on each stroke of said plunger for affecting rotation of said anvil, said spring means including a spring secured to said base within a recess therein and extending away from said base, said spring having a return-bent free end in contact with and urging said anvil upwardly away from said base, said anvil being movable against the free end of said spring on each stroke of said plunger and upon retraction of said plunger, said spring acts to rotate said anvil.

3. In a die cutting machine having a base, a pneumatic cylinder, means supporting said base and pneumatic cylinder in spaced relation to each other, a plunger operated by said cylinder, a die head secured to said plunger, means connected between said supporting means and said die head for adjustably determining the maximum stroke of said plunger, an anvil rotatably supported on said base in a plane normal to the line of movement of said plunger, said anvil being freely movable along its axis of rotation toward and away from said base, and spring means responsive to the impact of said die head on each stroke of said plunger for affecting rotation of said anvil, said spring means including a spring secured to said base within a recess therein and extending away from said base, said spring having a return-bent free end in contact with and urging said anvil upwardly away from said base, said anvil being movable against the free end of said spring on each stroke of said plunger and upon retraction of said plunger, said spring acts to rotate said anvil, the line of movement of said plunger being offset from the axis of rotation of said anvil.

References Cited in the file of this patent

UNITED STATES PATENTS

| | | |
|---|---|---|
| 279,314 | Arnold | June 12, 1883 |
| 299,329 | Behn | May 27, 1884 |
| 607,165 | Freese | July 12, 1898 |
| 1,063,871 | Grover | June 3, 1913 |
| 2,255,846 | Grammer | Sept. 16, 1941 |
| 2,269,914 | Parker | Jan. 13, 1942 |
| 2,431,528 | Wells | Nov. 25, 1947 |
| 2,494,970 | Shea | Jan. 17, 1950 |
| 2,502,072 | Bender | Mar. 28, 1950 |
| 2,623,417 | Hermann | Dec. 30, 1952 |
| 2,689,609 | Butler | Sept. 21, 1954 |
| 2,816,608 | Farmwald | Dec. 17, 1957 |

FOREIGN PATENTS

| | | |
|---|---|---|
| 182,992 | Germany | May 4, 1907 |
| 548,620 | Canada | Nov. 12, 1957 |